US007237609B2

(12) United States Patent
Nguyen

(10) Patent No.: US 7,237,609 B2
(45) Date of Patent: Jul. 3, 2007

(54) METHODS FOR PRODUCING FLUIDS FROM ACIDIZED AND CONSOLIDATED PORTIONS OF SUBTERRANEAN FORMATIONS

(75) Inventor: Philip D. Nguyen, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 214 days.

(21) Appl. No.: 10/977,673

(22) Filed: Oct. 29, 2004

(65) Prior Publication Data

US 2005/0061509 A1 Mar. 24, 2005

Related U.S. Application Data

(63) Continuation-in-part of application No. 10/650,063, filed on Aug. 26, 2003, now Pat. No. 7,017,665.

(51) Int. Cl.
*E21B 43/267* (2006.01)
*E21B 43/27* (2006.01)

(52) U.S. Cl. ............ 166/280.2; 166/281; 166/295; 166/300; 166/308.2; 166/308.3; 507/219; 507/220; 507/224; 507/225; 507/226; 507/260; 507/261; 507/267; 507/277

(58) Field of Classification Search ............ 166/280.2, 166/281, 295, 300, 307, 308.2, 308.3; 507/219, 507/220, 224, 225, 226, 260, 261, 266, 277
See application file for complete search history.

(56) References Cited

U.S. PATENT DOCUMENTS

| | | | |
|---|---|---|---|
| 2,238,671 A | 4/1941 | Woodhouse | 166/21 |
| 2,703,316 A | 3/1955 | Schneider | 260/78.3 |
| 2,869,642 A | 1/1959 | McKay et al. | |
| 3,047,067 A | 7/1962 | Williams et al. | 166/33 |
| 3,123,138 A | 3/1964 | Robichaux | 166/33 |
| 3,176,768 A | 4/1965 | Brandt et al. | 166/33 |
| 3,199,590 A | 8/1965 | Young | 166/33 |
| 3,272,650 A | 9/1966 | MacVittie | 134/7 |
| 3,297,086 A | 1/1967 | Spain | 166/33 |
| 3,308,885 A | 3/1967 | Sandiford | 166/33 |
| 3,316,965 A | 5/1967 | Watanabe | 166/33 |
| 3,375,872 A | 4/1968 | McLaughlin et al. | 166/29 |
| 3,404,735 A | 10/1968 | Young et al. | 166/33 |
| 3,415,320 A | 12/1968 | Young | 166/33 |
| 3,492,147 A | 1/1970 | Young et al. | 117/62.2 |
| 3,659,651 A | 5/1972 | Graham | 166/280 |
| 3,681,287 A | 8/1972 | Brown et al. | 260/67 |
| 3,754,598 A | 8/1973 | Holloway, Jr. | 166/249 |
| 3,765,804 A | 10/1973 | Brandon | 417/540 |
| 3,768,564 A | 10/1973 | Knox et al. | 166/307 |
| 3,784,585 A | 1/1974 | Schmitt et al. | 260/861 |
| 3,819,525 A | 6/1974 | Hattenbrun | 252/132 |
| 3,828,854 A | 8/1974 | Templeton et al. | 166/307 |
| 3,842,911 A | 10/1974 | Know et al. | 166/307 |
| 3,854,533 A | 12/1974 | Gurley et al. | 166/276 |
| 3,857,444 A | 12/1974 | Copeland | 166/276 |
| 3,863,709 A | 2/1975 | Fitch | 165/1 |
| 3,868,998 A | 3/1975 | Lybarger et al. | 166/278 |
| 3,888,311 A | 6/1975 | Cooke, Jr. | 166/280 |
| 3,902,557 A | 9/1975 | Shaughnessy et al. | |
| 3,912,692 A | 10/1975 | Casey et al. | 260/78.3 |
| 3,948,672 A | 4/1976 | Harnberger | 106/90 |
| 3,955,993 A | 5/1976 | Curtice | 106/90 |
| 3,960,736 A | 6/1976 | Free et al. | 252/8.55 R |
| 4,008,763 A | 2/1977 | Lowe et al. | 166/253 |
| 4,015,995 A | 4/1977 | Hess | 106/287 |
| 4,029,148 A | 6/1977 | Emery | 166/250.1 |
| 4,031,958 A | 6/1977 | Sandiford et al. | 166/270 |
| 4,042,032 A | 8/1977 | Anderson et al. | 166/276 |
| 4,070,865 A | 1/1978 | McLaughlin | 61/36 |
| 4,074,760 A | 2/1978 | Copeland et al. | 166/276 |
| 4,085,801 A | 4/1978 | Sifferman | 166/295 |
| 4,127,173 A | 11/1978 | Watkins et al. | 166/276 |
| 4,169,798 A | 10/1979 | DeMartino | 252/8.55 R |
| 4,172,066 A | 10/1979 | Zweigle et al. | 260/29.6 TA |
| 4,245,702 A | 1/1981 | Haafkens et al. | 166/307 |
| 4,273,187 A | 6/1981 | Satter et al. | 166/250 |
| 4,291,766 A | 9/1981 | Davies et al. | 166/276 |

(Continued)

FOREIGN PATENT DOCUMENTS

CA 2063877 5/2003

(Continued)

OTHER PUBLICATIONS

U.S. Appl. No. 10/383,154, filed Mar. 6, 2003, Nguyen et al.

(Continued)

*Primary Examiner*—George Suchfield
(74) *Attorney, Agent, or Firm*—Robert A. Kent; Baker Botts

(57) ABSTRACT

A method of stimulating and stabilizing an area of a subterranean formation comprising placing an acid fluid into an area of a subterranean formation and allowing the acid to at least partially dissolve a portion of the area of the subterranean formation; placing a consolidation fluid into the area of the subterranean formation; and, placing an afterflush fluid into the area of the subterranean formation. A method of stimulating and stabilizing an area of a subterranean formation comprising placing an acid fluid into an area of a subterranean formation and allowing the acid to at least partially dissolve a portion of the area of the subterranean formation; placing a consolidation fluid into the area of the subterranean formation; and, placing a fracturing fluid into the area of the subterranean formation at a pressure sufficient to create or extend at least one fracture therein.

71 Claims, No Drawings

U.S. PATENT DOCUMENTS

| | | | |
|---|---|---|---|
| 4,305,463 A | 12/1981 | Zakiewicz | 106/245 |
| 4,336,842 A | 6/1982 | Graham et al. | 166/276 |
| 4,352,674 A | 10/1982 | Fery | 23/230 |
| 4,353,806 A | 10/1982 | Canter et al. | 507/229 |
| 4,387,769 A | 6/1983 | Erbstoesser et al. | 166/295 |
| 4,415,805 A | 11/1983 | Fertl et al. | 250/260 |
| 4,439,489 A | 3/1984 | Johnson et al. | 428/404 |
| 4,443,347 A | 4/1984 | Underdown et al. | 252/8.55 R |
| 4,460,052 A | 7/1984 | Gockel | 175/72 |
| 4,470,915 A | 9/1984 | Conway | 252/8.55 R |
| 4,493,875 A | 1/1985 | Beck et al. | 428/403 |
| 4,494,605 A | 1/1985 | Wiechel et al. | 166/288 |
| 4,498,995 A | 2/1985 | Gockel | 252/8.5 LC |
| 4,501,328 A | 2/1985 | Nichols | 166/288 |
| 4,526,695 A | 7/1985 | Erbstosser et al. | 252/8.55 R |
| 4,527,627 A | 7/1985 | Graham et al. | 166/280 |
| 4,541,489 A | 9/1985 | Wu | 166/312 |
| 4,546,012 A | 10/1985 | Brooks | 427/213 |
| 4,553,596 A | 11/1985 | Graham et al. | 166/295 |
| 4,564,459 A | 1/1986 | Underdown et al. | 252/8.55 R |
| 4,572,803 A | 2/1986 | Yamazoe et al. | 534/16 |
| 4,649,998 A | 3/1987 | Friedman | 166/294 |
| 4,664,819 A | 5/1987 | Glaze et al. | 252/8.551 |
| 4,665,988 A | 5/1987 | Murphey et al. | 166/295 |
| 4,669,543 A | 6/1987 | Young | 166/276 |
| 4,675,140 A | 6/1987 | Sparks et al. | 264/4.3 |
| 4,683,954 A | 8/1987 | Walker et al. | 166/307 |
| 4,694,905 A | 9/1987 | Armbruster | 166/280 |
| 4,715,967 A | 12/1987 | Bellis | 252/8.551 |
| 4,716,964 A | 1/1988 | Erbstoesser et al. | 166/284 |
| 4,733,729 A | 3/1988 | Copeland | 166/276 |
| 4,739,832 A | 4/1988 | Jennings, Jr. et al. | 166/299 |
| 4,785,884 A | 11/1988 | Armbruster | 166/280 |
| 4,787,453 A | 11/1988 | Hewgill et al. | 166/272.3 |
| 4,789,105 A | 12/1988 | Hosokawa et al. | 241/67 |
| 4,796,701 A | 1/1989 | Hudson et al. | 166/278 |
| 4,797,262 A | 1/1989 | Dewitz | 422/142 |
| 4,800,960 A | 1/1989 | Friedman et al. | 166/276 |
| 4,809,783 A | 3/1989 | Hollenbeck et al. | 166/307 |
| 4,817,721 A | 4/1989 | Pober | 166/295 |
| 4,829,100 A | 5/1989 | Murphey et al. | 523/131 |
| 4,838,352 A | 6/1989 | Oberste-Padtberg et al. | 166/291 |
| 4,842,072 A | 6/1989 | Friedman et al. | 166/295 |
| 4,843,118 A | 6/1989 | Lai et al. | 524/555 |
| 4,848,467 A | 7/1989 | Cantu et al. | 166/281 |
| 4,848,470 A | 7/1989 | Korpics | 166/312 |
| 4,850,430 A | 7/1989 | Copeland et al. | 166/276 |
| 4,886,354 A | 12/1989 | Welch et al. | 356/70 |
| 4,888,240 A | 12/1989 | Graham et al. | 428/403 |
| 4,895,207 A | 1/1990 | Friedman et al. | 166/276 |
| 4,903,770 A | 2/1990 | Friedman et al. | 166/288 |
| 4,934,456 A | 6/1990 | Moradi-Araghi | 166/270 |
| 4,936,385 A | 6/1990 | Weaver et al. | 166/288 |
| 4,942,186 A | 7/1990 | Murphey et al. | 523/131 |
| 4,957,165 A | 9/1990 | Cantu et al. | 166/295 |
| 4,959,432 A | 9/1990 | Fan et al. | 526/287 |
| 4,961,466 A | 10/1990 | Himes et al. | 166/250 |
| 4,969,522 A | 11/1990 | Whitehurst et al. | 166/278 |
| 4,969,523 A | 11/1990 | Martin et al. | 166/278 |
| 4,986,353 A | 1/1991 | Clark et al. | 166/279 |
| 4,986,354 A | 1/1991 | Cantu et al. | 166/279 |
| 4,986,355 A | 1/1991 | Casad et al. | 166/295 |
| 5,030,603 A | 7/1991 | Rumpf et al. | 501/127 |
| 5,049,743 A | 9/1991 | Taylor, III et al. | 250/303 |
| 5,082,056 A | 1/1992 | Tackett, Jr. | 166/295 |
| 5,107,928 A | 4/1992 | Hilterhaus | 166/293 |
| 5,128,390 A | 7/1992 | Murphey et al. | 523/130 |
| 5,135,051 A | 8/1992 | Fracteau et al. | 166/104 |
| 5,142,023 A | 8/1992 | Gruber et al. | 528/354 |
| 5,165,438 A | 11/1992 | Fracteau et al. | 137/1 |
| 5,173,527 A | 12/1992 | Calve | 524/74 |
| 5,178,218 A | 1/1993 | Dees | 166/281 |
| 5,182,051 A | 1/1993 | Bandy et al. | 252/645 |
| 5,199,491 A | 4/1993 | Kutts et al. | 166/276 |
| 5,199,492 A | 4/1993 | Surles et al. | 166/295 |
| 5,211,234 A | 5/1993 | Floyd | 166/276 |
| 5,216,050 A | 6/1993 | Sinclair | 524/108 |
| 5,218,038 A | 6/1993 | Johnson et al. | 524/541 |
| 5,232,955 A | 8/1993 | Caabai et al. | 521/63 |
| 5,232,961 A | 8/1993 | Murphey et al. | 523/414 |
| 5,238,068 A | 8/1993 | Fredrickson | 166/307 |
| 5,247,059 A | 9/1993 | Gruber et al. | 528/354 |
| 5,249,628 A | 10/1993 | Surjaatmadja | 166/305 |
| 5,256,729 A | 10/1993 | Kutts et al. | 524/700 |
| 5,273,115 A | 12/1993 | Spafford | 166/281 |
| 5,285,849 A | 2/1994 | Surles et al. | 166/295 |
| 5,293,939 A | 3/1994 | Surles et al. | 166/295 |
| 5,295,542 A | 3/1994 | Cole et al. | 166/278 |
| 5,320,171 A | 6/1994 | Laramay | 166/285 |
| 5,321,062 A | 6/1994 | Landrum et al. | 523/141 |
| 5,325,923 A | 7/1994 | Surjaatmadja et al. | 166/308 |
| 5,330,005 A | 7/1994 | Card et al. | 166/280 |
| 5,332,037 A | 7/1994 | Schmidt et al. | 166/276 |
| 5,335,726 A | 8/1994 | Rodrogues | 166/295 |
| 5,351,754 A | 10/1994 | Hardin et al. | 166/249 |
| 5,358,051 A | 10/1994 | Rodrigues | 166/295 |
| 5,359,026 A | 10/1994 | Gruber | 528/354 |
| 5,360,068 A | 11/1994 | Sprunt et al. | 166/259 |
| 5,361,856 A | 11/1994 | Surjaatmadja et al. | 175/67 |
| 5,363,916 A | 11/1994 | Himes et al. | 166/276 |
| 5,373,901 A | 12/1994 | Norman et al. | 166/300 |
| 5,377,759 A | 1/1995 | Surles | 166/295 |
| 5,381,864 A | 1/1995 | Nguyen et al. | 166/280 |
| 5,386,874 A | 2/1995 | Laramay et al. | 166/300 |
| 5,388,648 A | 2/1995 | Jordan, Jr. | 166/380 |
| 5,393,810 A | 2/1995 | Harris et al. | 524/56 |
| 5,396,957 A | 3/1995 | Surjaatmadja et al. | 166/308 |
| 5,402,846 A | 4/1995 | Jennings, Jr. et al. | 166/259 |
| 5,422,183 A | 6/1995 | Sinclair et al. | 428/403 |
| 5,423,381 A | 6/1995 | Surles et al. | 166/295 |
| 5,439,055 A | 8/1995 | Card et al. | 166/280 |
| 5,460,226 A | 10/1995 | Lawton et al. | 166/300 |
| 5,464,060 A | 11/1995 | Hale et al. | 166/293 |
| 5,475,080 A | 12/1995 | Gruber et al. | 528/354 |
| 5,484,881 A | 1/1996 | Gruber et al. | 528/54 |
| 5,492,178 A | 2/1996 | Nguyen et al. | 166/276 |
| 5,494,103 A | 2/1996 | Surjaatmadja et al. | 166/222 |
| 5,497,830 A | 3/1996 | Boles et al. | 166/300 |
| 5,498,280 A | 3/1996 | Fistner et al. | 106/19 |
| 5,499,678 A | 3/1996 | Surjaatmadja et al. | 166/298 |
| 5,501,275 A | 3/1996 | Card et al. | 166/280 |
| 5,505,787 A | 4/1996 | Yamaguchi | 134/4 |
| 5,512,071 A | 4/1996 | Yam et al. | 51/307 |
| 5,520,250 A | 5/1996 | Harry et al. | 166/278 |
| 5,522,460 A | 6/1996 | Shu | 166/295 |
| 5,529,123 A | 6/1996 | Carpenter et al. | 166/293 |
| 5,531,274 A | 7/1996 | Bienvenu, Jr. | 166/280 |
| 5,536,807 A | 7/1996 | Gruber et al. | 528/354 |
| 5,545,824 A | 8/1996 | Stengel et al. | 524/590 |
| 5,547,023 A | 8/1996 | McDaniel et al. | 166/280 |
| 5,551,513 A | 9/1996 | Suries et al. | 166/278 |
| 5,551,514 A | 9/1996 | Nelson et al. | 166/280 |
| 5,582,249 A | 12/1996 | Caveny et al. | 166/276 |
| 5,582,250 A | 12/1996 | Constein | 166/280 |
| 5,588,488 A | 12/1996 | Vijn et al. | 166/293 |
| 5,591,700 A | 1/1997 | Harris et al. | 507/204 |
| 5,594,095 A | 1/1997 | Gruber et al. | 528/354 |
| 5,595,245 A | 1/1997 | Scott, III | 166/250.1 |
| 5,597,784 A | 1/1997 | Sinclair et al. | 507/219 |
| 5,604,184 A | 2/1997 | Ellis et al. | 507/117 |
| 5,604,186 A | 2/1997 | Hunt et al. | 507/204 |
| 5,609,207 A | 3/1997 | Dewprashad et al. | 166/276 |
| 5,620,049 A | 4/1997 | Gipson et al. | 166/248 |

| | | | |
|---|---|---|---|
| 5,639,806 A | 6/1997 | Johnson et al. .............. 523/208 |
| 5,670,473 A | 9/1997 | Scepanski .................... 510/445 |
| 5,692,566 A | 12/1997 | Surles ......................... 166/295 |
| 5,697,440 A | 12/1997 | Weaver et al. ............... 166/281 |
| 5,698,322 A | 12/1997 | Tsai et al. .................... 428/373 |
| 5,712,314 A | 1/1998 | Surles et al. .................. 521/41 |
| 5,732,364 A | 3/1998 | Kalb et al. ....................... 588/8 |
| 5,765,642 A | 6/1998 | Surjaatmadja ............... 166/297 |
| 5,775,425 A | 7/1998 | Weaver et al. ............... 166/276 |
| 5,782,300 A | 7/1998 | James et al. ................. 166/278 |
| 5,783,822 A | 7/1998 | Buchanan et al. ........... 250/259 |
| 5,787,986 A | 8/1998 | Weaver et al. ............... 166/280 |
| 5,791,415 A | 8/1998 | Nguyen et al. ............... 166/280 |
| 5,799,734 A | 9/1998 | Norman et al. .............. 166/278 |
| 5,806,593 A | 9/1998 | Suries ......................... 166/270 |
| 5,830,987 A | 11/1998 | Smith .......................... 528/332 |
| 5,833,000 A | 11/1998 | Weaver et al. ............... 166/276 |
| 5,833,361 A | 11/1998 | Funk ............................. 366/80 |
| 5,836,391 A | 11/1998 | Jonasson et al. ............. 166/295 |
| 5,836,392 A | 11/1998 | Urlwin-Smith .............. 166/295 |
| 5,837,656 A | 11/1998 | Sinclair et al. ............... 507/220 |
| 5,837,785 A | 11/1998 | Kinsho et al. ................ 525/527 |
| 5,839,510 A | 11/1998 | Weaver et al. ............... 166/276 |
| 5,840,784 A | 11/1998 | Funkhouser et al. ........ 523/130 |
| 5,849,401 A | 12/1998 | El-Afandi et al. ........... 428/215 |
| 5,849,590 A | 12/1998 | Anderson, II et al. ......... 436/27 |
| 5,853,048 A | 12/1998 | Weaver et al. ............... 166/279 |
| 5,864,003 A | 1/1999 | Qureshi et al. ............... 528/141 |
| 5,865,936 A | 2/1999 | Edelman et al. ............. 156/310 |
| 5,871,049 A | 2/1999 | Weaver et al. ............... 166/276 |
| 5,873,413 A | 2/1999 | Chatterji et al. ............. 166/293 |
| 5,875,844 A | 3/1999 | Chatterji et al. ............. 166/293 |
| 5,875,845 A | 3/1999 | Chatterji et al. ............. 166/293 |
| 5,875,846 A | 3/1999 | Chatterji et al. ............. 166/293 |
| 5,893,383 A | 4/1999 | Fracteau ....................... 137/14 |
| 5,893,416 A | 4/1999 | Read ........................... 166/304 |
| 5,908,073 A | 6/1999 | Nguyen et al. ............... 166/276 |
| 5,911,282 A | 6/1999 | Onan et al. .................... 175/72 |
| 5,916,933 A | 6/1999 | Johnson et al. .............. 523/208 |
| 5,921,317 A | 7/1999 | Dewprashad et al. ....... 166/208 |
| 5,924,488 A | 7/1999 | Nguyen et al. ............... 166/280 |
| 5,929,437 A | 7/1999 | Elliott et al. ................. 250/259 |
| 5,944,105 A | 8/1999 | Nguyen ....................... 166/278 |
| 5,945,387 A | 8/1999 | Chatterji et al. ............. 507/224 |
| 5,948,734 A | 9/1999 | Sinclair et al. ............... 507/219 |
| 5,957,204 A | 9/1999 | Chatterji et al. ............. 166/295 |
| 5,960,877 A | 10/1999 | Funkhouser et al. ........ 166/270 |
| 5,960,880 A | 10/1999 | Nguyen et al. ............... 166/280 |
| 5,964,291 A | 10/1999 | Bourne et al. ............... 166/279 |
| 5,969,006 A | 10/1999 | Onan et al. ................... 523/166 |
| 5,977,283 A | 11/1999 | Rossitto ........................ 528/44 |
| 5,994,785 A | 11/1999 | Higuchi et al. .............. 527/789 |
| RE36,466 E | 12/1999 | Nelson et al. ................ 166/280 |
| 6,003,600 A | 12/1999 | Nguyen et al. ............... 166/281 |
| 6,004,400 A | 12/1999 | Bishop et al. ................... 134/2 |
| 6,006,835 A | 12/1999 | Onan et al. ................... 166/295 |
| 6,006,836 A | 12/1999 | Chatterji et al. ............. 166/295 |
| 6,012,524 A | 1/2000 | Chatterji et al. ............. 166/295 |
| 6,016,870 A | 1/2000 | Dewprashad et al. ....... 166/295 |
| 6,024,170 A | 2/2000 | McCabe et al. .............. 166/300 |
| 6,028,113 A | 2/2000 | Scepanski .................... 514/643 |
| 6,028,534 A | 2/2000 | Ciglenec et al. ........... 340/856.2 |
| 6,040,398 A | 3/2000 | Kinsho et al. ................ 525/527 |
| 6,047,772 A | 4/2000 | Weaver et al. ............... 166/276 |
| 6,059,034 A | 5/2000 | Rickards et al. ............. 166/280 |
| 6,059,035 A | 5/2000 | Chatterji et al. ............. 166/293 |
| 6,059,036 A | 5/2000 | Chatterji et al. ............. 166/294 |
| 6,068,055 A | 5/2000 | Chatterji et al. ............. 166/293 |
| 6,069,117 A | 5/2000 | Onan et al. ................... 507/202 |
| 6,074,739 A | 6/2000 | Katagiri ....................... 428/323 |
| 6,079,492 A | 6/2000 | Hoogteijling et al. ....... 166/276 |
| 6,098,711 A | 8/2000 | Chatterji et al. ............. 166/294 |
| 6,114,410 A | 9/2000 | Betzold ....................... 523/130 |
| 6,123,871 A | 9/2000 | Carroll ................... 252/301.36 |
| 6,123,965 A | 9/2000 | Jacon et al. .................. 424/489 |
| 6,124,246 A | 9/2000 | Heathman et al. ........... 507/219 |
| 6,130,286 A | 10/2000 | Thomas et al. .............. 524/507 |
| 6,135,987 A | 10/2000 | Tsai et al. .................... 604/365 |
| 6,140,446 A | 10/2000 | Fujiki et al. ................... 528/15 |
| 6,148,911 A | 11/2000 | Gipson et al. ............... 166/248 |
| 6,152,234 A | 11/2000 | Newhouse et al. .......... 166/403 |
| 6,162,766 A | 12/2000 | Muir et al. ................... 507/267 |
| 6,169,058 B1 | 1/2001 | Le et al. ...................... 507/222 |
| 6,172,011 B1 | 1/2001 | Card et al. ................... 507/204 |
| 6,172,077 B1 | 1/2001 | Curtis et al. ................. 514/278 |
| 6,176,315 B1 | 1/2001 | Reddy et al. ................ 166/295 |
| 6,177,484 B1 | 1/2001 | Surles ......................... 523/131 |
| 6,184,311 B1 | 2/2001 | O'Keefe et al. ............. 525/438 |
| 6,187,834 B1 | 2/2001 | Thayer et al. ................ 522/15 |
| 6,187,839 B1 | 2/2001 | Eoff et al. ................... 523/130 |
| 6,189,615 B1 | 2/2001 | Sydansk ...................... 166/270 |
| 6,192,985 B1 | 2/2001 | Hinkel et al. ................ 166/280 |
| 6,192,986 B1 | 2/2001 | Urlwin-Smith ............. 166/295 |
| 6,196,317 B1 | 3/2001 | Hardy ......................... 166/295 |
| 6,202,751 B1 | 3/2001 | Chatterji et al. ............. 166/276 |
| 6,209,643 B1 | 4/2001 | Nguyen et al. ............... 166/276 |
| 6,209,644 B1 | 4/2001 | Brunet ......................... 166/297 |
| 6,209,646 B1 | 4/2001 | Reddy et al. ................ 166/300 |
| 6,210,471 B1 | 4/2001 | Craig ...................... 106/31.08 |
| 6,214,773 B1 | 4/2001 | Harris et al. ................. 507/271 |
| 6,231,664 B1 | 5/2001 | Chatterji et al. ............. 106/724 |
| 6,234,251 B1 | 5/2001 | Chatterji et al. ............. 166/295 |
| 6,238,597 B1 | 5/2001 | Yim et al. ................... 252/512 |
| 6,241,019 B1 | 6/2001 | Davidson et al. ........... 166/249 |
| 6,242,390 B1 | 6/2001 | Mitchell et al. ............. 507/211 |
| 6,244,344 B1 | 6/2001 | Chatterji et al. ............. 166/295 |
| 6,257,335 B1 | 7/2001 | Nguyen et al. ............... 166/280 |
| 6,260,622 B1 | 7/2001 | Blok et al. ................ 166/305.1 |
| 6,271,181 B1 | 8/2001 | Chatterji et al. ............. 507/219 |
| 6,274,650 B1 | 8/2001 | Cui ............................. 523/457 |
| 6,279,652 B1 | 8/2001 | Chatterji et al. ............. 166/194 |
| 6,279,656 B1 | 8/2001 | Sinclair et al. ............... 166/310 |
| 6,283,214 B1 | 9/2001 | Guinot et al. ................ 166/297 |
| 6,302,207 B1 | 10/2001 | Nguyen et al. ............... 166/276 |
| 6,306,998 B1 | 10/2001 | Kimura et al. ................ 528/12 |
| 6,311,773 B1 | 11/2001 | Todd et al. .................. 166/280 |
| 6,321,841 B1 | 11/2001 | Eoff et al. ................... 166/291 |
| 6,323,307 B1 | 11/2001 | Bigg et al. ................... 528/354 |
| 6,326,458 B1 | 12/2001 | Gruber et al. ............... 528/354 |
| 6,328,105 B1 | 12/2001 | Betzold ....................... 166/280 |
| 6,328,106 B1 | 12/2001 | Griffith et al. ............... 166/295 |
| 6,330,916 B1 | 12/2001 | Rickards et al. ............. 166/280 |
| 6,330,917 B2 | 12/2001 | Chatterji et al. ............. 166/295 |
| 6,350,309 B2 | 2/2002 | Chatterji et al. ............. 106/677 |
| 6,357,527 B1 | 3/2002 | Norman et al. .............. 166/300 |
| 6,364,018 B1 | 4/2002 | Brannon et al. .......... 166/280.2 |
| 6,364,945 B1 | 4/2002 | Chatterji et al. ............. 106/677 |
| 6,367,165 B1 | 4/2002 | Huttlin ......................... 34/582 |
| 6,367,549 B1 | 4/2002 | Chatterji et al. ............. 166/292 |
| 6,372,678 B1 | 4/2002 | Youngsman et al. ........ 504/128 |
| 6,376,571 B1 | 4/2002 | Chawla et al. ................ 522/64 |
| 6,387,986 B1 | 5/2002 | Moradi-Araghi et al. ... 523/211 |
| 6,390,195 B1 | 5/2002 | Nguyen et al. ............... 166/276 |
| 6,401,817 B1 | 6/2002 | Griffith et al. ............... 166/295 |
| 6,405,797 B2 | 6/2002 | Davidson et al. ........... 166/249 |
| 6,406,789 B1 | 6/2002 | McDaniel et al. ........... 428/403 |
| 6,408,943 B1 | 6/2002 | Schultz et al. ............... 166/285 |
| 6,422,314 B1 | 7/2002 | Todd et al. .................. 166/312 |
| 6,439,309 B1 | 8/2002 | Matherly et al. ............ 166/276 |
| 6,439,310 B1 | 8/2002 | Scott, III et al. ............. 166/308 |
| 6,440,255 B1 | 8/2002 | Kohlhammer et al. ...... 156/283 |
| 6,446,727 B1 | 9/2002 | Zemlak et al. ............... 166/308 |
| 6,448,206 B1 | 9/2002 | Griffith et al. ............... 507/219 |
| 6,450,260 B1 | 9/2002 | James et al. ................. 166/277 |
| 6,454,003 B1 | 9/2002 | Chang et al. ................ 166/270 |
| 6,458,885 B1 | 10/2002 | Stengal et al. ............... 524/507 |

| | | | |
|---|---|---|---|
| 6,485,947 B1 | 11/2002 | Rajgarhia et al. | 435/139 |
| 6,488,091 B1 | 12/2002 | Weaver et al. | 166/300 |
| 6,488,763 B2 | 12/2002 | Brothers et al. | 106/692 |
| 6,494,263 B2 | 12/2002 | Todd | 166/312 |
| 6,503,870 B2 | 1/2003 | Griffith et al. | 507/219 |
| 6,508,305 B1 | 1/2003 | Brannon et al. | 166/293 |
| 6,527,051 B1 | 3/2003 | Reddy et al. | 166/300 |
| 6,528,157 B1 | 3/2003 | Hussain et al. | 428/325 |
| 6,531,427 B1 | 3/2003 | Shuchart et al. | 507/267 |
| 6,538,576 B1 | 3/2003 | Schultz et al. | 340/859.6 |
| 6,543,545 B1 | 4/2003 | Chatterji et al. | 166/381 |
| 6,552,333 B1 | 4/2003 | Storm et al. | 250/269.3 |
| 6,554,071 B1 | 4/2003 | Reddy et al. | 166/293 |
| 6,555,507 B2 | 4/2003 | Chatterji et al. | 507/219 |
| 6,569,814 B1 | 5/2003 | Brady et al. | 507/201 |
| 6,582,819 B2 | 6/2003 | McDaniel et al. | 428/402 |
| 6,593,402 B2 | 7/2003 | Chatterji et al. | 524/7 |
| 6,599,863 B1 | 7/2003 | Palmer et al. | 507/219 |
| 6,608,162 B1 | 8/2003 | Chiu et al. | 528/129 |
| 6,616,320 B2 | 9/2003 | Huber et al. | 366/156.2 |
| 6,620,857 B2 | 9/2003 | Valet | 522/42 |
| 6,626,241 B2 | 9/2003 | Nguyen | 166/278 |
| 6,632,527 B1 | 10/2003 | McDaniel et al. | 428/402 |
| 6,632,892 B2 | 10/2003 | Rubinsztajn et al. | 525/476 |
| 6,642,309 B2 | 11/2003 | Komitsu et al. | 525/100 |
| 6,648,501 B2 | 11/2003 | Huber et al. | 366/301 |
| 6,659,179 B2 | 12/2003 | Nguyen | 166/227 |
| 6,664,343 B2 | 12/2003 | Narisawa et al. | 525/474 |
| 6,667,279 B1 | 12/2003 | Hessert et al. | 507/225 |
| 6,668,926 B2 | 12/2003 | Nguyen et al. | 166/280 |
| 6,669,771 B2 | 12/2003 | Tokiwa et al. | 106/162.7 |
| 6,681,856 B1 | 1/2004 | Chatterji et al. | 166/294 |
| 6,686,328 B1 | 2/2004 | Binder | 510/446 |
| 6,705,400 B1 | 3/2004 | Nugyen et al. | 166/281 |
| 6,710,019 B1 | 3/2004 | Sawdon et al. | 507/136 |
| 6,713,170 B1 | 3/2004 | Kaneka et al. | 428/323 |
| 6,725,926 B2 | 4/2004 | Nguyen et al. | 166/254.1 |
| 6,725,931 B2 | 4/2004 | Nguyen et al. | 166/280.2 |
| 6,729,404 B2 | 5/2004 | Nguyen et al. | 166/280.2 |
| 6,732,800 B2 | 5/2004 | Acock et al. | 166/308 |
| 6,745,159 B1 | 6/2004 | Todd et al. | 703/10 |
| 6,749,025 B1 | 6/2004 | Brannon et al. | 166/305.1 |
| 6,763,888 B1 | 7/2004 | Harris et al. | 166/305.1 |
| 6,766,858 B2 | 7/2004 | Nguyen et al. | 166/300 |
| 6,776,236 B1 | 8/2004 | Nguyen | 166/279 |
| 6,832,650 B2 | 12/2004 | Nguyen et al. | 166/279 |
| 6,851,474 B2 | 2/2005 | Nguyen | 166/279 |
| 6,887,834 B2 | 5/2005 | Nguyen et al. | 507/221 |
| 6,978,836 B2 | 12/2005 | Nguyen et al. | 166/295 |
| 2001/0016562 A1 | 8/2001 | Muir et al. | 507/201 |
| 2002/0043370 A1 | 4/2002 | Poe | 166/250.07 |
| 2002/0048676 A1 | 4/2002 | McDaniel et al. | 428/404 |
| 2002/0070020 A1 | 6/2002 | Nguyen | 166/295 |
| 2003/0006036 A1 | 1/2003 | Malone et al. | 166/250.12 |
| 2003/0060374 A1 | 3/2003 | Cooke, Jr. | 507/200 |
| 2003/0114314 A1 | 6/2003 | Ballard et al. | 507/100 |
| 2003/0130133 A1 | 7/2003 | Vollmer | 507/100 |
| 2003/0131999 A1 | 7/2003 | Nguyen et al. | 166/280 |
| 2003/0148893 A1 | 8/2003 | Lungofer et al. | 507/200 |
| 2003/0186820 A1 | 10/2003 | Thesing | 507/200 |
| 2003/0188766 A1 | 10/2003 | Banerjee et al. | 134/7 |
| 2003/0188872 A1 | 10/2003 | Nguyen et al. | 166/308 |
| 2003/0196805 A1 | 10/2003 | Boney et al. | 166/280 |
| 2003/0205376 A1 | 11/2003 | Ayoub et al. | 166/254.2 |
| 2003/0230408 A1 | 12/2003 | Acock et al. | 166/297 |
| 2003/0234103 A1 | 12/2003 | Lee et al. | 166/293 |
| 2004/0000402 A1 | 1/2004 | Nguyen et al. | 166/280 |
| 2004/0014607 A1 | 1/2004 | Sinclair et al. | 507/200 |
| 2004/0014608 A1 | 1/2004 | Nguyen et al. | 507/200 |
| 2004/0040706 A1 | 3/2004 | Hossaini et al. | 166/278 |
| 2004/0040708 A1 | 3/2004 | Stephenson et al. | 166/280.1 |
| 2004/0040713 A1 | 3/2004 | Nguyen et al. | 166/295 |
| 2004/0048752 A1 | 3/2004 | Nguyen et al. | 507/269 |
| 2004/0055747 A1 | 3/2004 | Lee | 166/278 |
| 2004/0106525 A1 | 6/2004 | Willbert et al. | 507/200 |
| 2004/0138068 A1 | 7/2004 | Rimmer et al. | 507/100 |
| 2004/0149441 A1 | 8/2004 | Nguyen et al. | 166/280.1 |
| 2004/0152601 A1 | 8/2004 | Still et al. | 507/100 |
| 2004/0177961 A1 | 9/2004 | Nguyen et al. | 166/280.2 |
| 2004/0194961 A1 | 10/2004 | Nguyen et al. | 166/295 |
| 2004/0206499 A1 | 10/2004 | Nguyen et al. | 166/280.2 |
| 2004/0211559 A1 | 10/2004 | Nguyen et al. | 166/276 |
| 2004/0211561 A1 | 10/2004 | Nguyen et al. | 166/280.2 |
| 2004/0221992 A1 | 11/2004 | Nguyen et al. | 166/295 |
| 2004/0231845 A1 | 11/2004 | Cooke, Jr. | 166/279 |
| 2004/0231847 A1 | 11/2004 | Nguyen et al. | 166/295 |
| 2004/0256099 A1 | 12/2004 | Nguyen et al. | 166/249 |
| 2004/0261995 A1 | 12/2004 | Nguyen et al. | 166/279 |
| 2004/0261997 A1 | 12/2004 | Nguyen et al. | 166/281 |
| 2005/0000731 A1 | 1/2005 | Nguyen et al. | 175/57 |
| 2005/0006093 A1 | 1/2005 | Nguyen et al. | 166/281 |
| 2005/0006095 A1 | 1/2005 | Justus et al. | 166/295 |
| 2005/0006096 A1 | 1/2005 | Nguyen et al. | 166/295 |
| 2005/0034862 A1 | 2/2005 | Nguyen et al. | 166/281 |
| 2005/0045326 A1 | 3/2005 | Nguyen | 166/278 |

FOREIGN PATENT DOCUMENTS

| | | | |
|---|---|---|---|
| EP | 0313243 | B1 | 10/1988 |
| EP | 0528595 | A1 | 8/1992 |
| EP | 0510762 | A2 | 11/1992 |
| EP | 0643196 | A2 | 6/1994 |
| EP | 0834644 | A2 | 4/1998 |
| EP | 0853186 | A2 | 7/1998 |
| EP | 0864726 | A2 | 9/1998 |
| EP | 0879935 | B1 | 11/1998 |
| EP | 0933498 | A1 | 8/1999 |
| EP | 1001133 | A1 | 5/2000 |
| EP | 1132569 | A2 | 9/2001 |
| EP | 1326003 | A1 | 7/2003 |
| EP | 1394355 | A1 | 3/2004 |
| EP | 1396606 | A2 | 3/2004 |
| EP | 1398640 | A1 | 3/2004 |
| EP | 1403466 | A2 | 3/2004 |
| EP | 1464789 | A1 | 10/2004 |
| GB | 1107584 | | 3/1968 |
| GB | 1264180 | | 12/1969 |
| GB | 1292718 | | 10/1972 |
| GB | 2382143 | A | 4/2001 |
| WO | WO 93/15127 | | 8/1993 |
| WO | WO 94/07949 | | 4/1994 |
| WO | WO 94/08078 | | 4/1994 |
| WO | WO 94/08090 | | 4/1994 |
| WO | WO 95/09879 | | 4/1995 |
| WO | WO 97/11845 | | 4/1997 |
| WO | WO 99/27229 | | 6/1999 |
| WO | WO 01/81914 | | 11/2001 |
| WO | WO 01/87797 | A1 | 11/2001 |
| WO | WO 02/12674 | A1 | 2/2002 |
| WO | WO 03/027431 | A1 | 4/2003 |
| WO | WO 04/037946 | A1 | 5/2004 |
| WO | WO 04/038176 | A1 | 5/2004 |
| WO | WO 05/021928 | A2 | 3/2005 |

OTHER PUBLICATIONS

U.S. Appl. No. 10/394,898, filed Mar. 21, 2003, Eoff et al.
U.S. Appl. No. 10/408,800, filed Apr. 7, 2003, Nguyen et al.
U.S. Appl. No. 10/601,407, filed Jun. 25, 2003, Byrd et al.
U.S. Appl. No. 10/603,492, filed Jun. 25, 2003, Nguyen et al.
U.S. Appl. No. 10/649,029, filed Aug. 27, 2003, Nguyen et al.
U.S. Appl. No. 10/650,063, filed Aug. 26, 2003, Nguyen.
U.S. Appl. No. 10/650,064, filed Aug. 26, 2003, Nguyen et al.
U.S. Appl. No. 10/650,065, filed Aug. 26, 2003, Nguyen.
U.S. Appl. No. 10/659,574, filed Sep. 10, 2003, Nguyen et al.
U.S. Appl. No. 10/727,365, filed Dec. 4, 2003, Reddy et al.
U.S. Appl. No. 10/751,593, filed Jan. 5, 2004, Nguyen.

U.S. Appl. No. 10/775,347, filed Feb. 10, 2004, Nguyen.
U.S. Appl. No. 10/791,944, filed Mar. 3, 2004, Nguyen.
U.S. Appl. No. 10/793,711, filed Mar. 5, 2004, Nguyen et al.
U.S. Appl. No. 10/852,811, filed May 25, 2004, Nguyen.
U.S. Appl. No. 10/853,879, filed May 26, 2004, Nguyen et al.
U.S. Appl. No. 10/860,951, filed Jun. 4, 2004, Stegent et al.
U.S. Appl. No. 10/861,829, filed Jun. 4, 2004, Stegent et al.
U.S. Appl. No. 10/862,986, filed Jun. 8, 2004, Nguyen et al.
U.S. Appl. No. 10/868,593, filed Jun. 15, 2004, Nguyen et al.
U.S. Appl. No. 10/868,608, filed Jun. 15, 2004, Nguyen et al.
U.S. Appl. No. 10/937,076, filed Sep. 9, 2004, Nguyen et al.
U.S. Appl. No. 10/944,973, filed Sep. 20, 2004, Nguyen et al.
U.S. Appl. No. 10/972,648, filed Oct. 25, 2004, Dusterhoft et al.
U.S. Appl. No. 10/977,673, filed Oct. 29, 2004, Nguyen.
U.S. Appl. No. 11/009,277, filed Dec. 8, 2004, Welton et al.
U.S. Appl. No. 11/011,394, filed Dec. 12, 2004, Nguyen et al.
U.S. Appl. No. 11/035,833, filed Jan. 14, 2005, Nguyen.
U.S. Appl. No. 11/049,252, filed Feb. 2, 2005, Van Batenburg et al.
U.S. Appl. No. 11/053,280, filed Feb. 8, 2005, Nguyen.
U.S. Appl. No. 11/056,635, filed Feb. 11, 2005, Dusterhoft et al.
Halliburton, CoalStim$^{SM}$ Service, Helps Boost Cash Flow From CBM Assets, Stimulation, HO3679 Oct. 3, 2003, Halliburton Communications.
Halliburton, Conductivity Endurance Technology For High Permeability Reservoirs, Helps Prevent Intrusion of Formation Material Into the Proppant Pack for Improved Long-term Production, Stimulation, 2003, Halliburton Communications.
Halliburton, Expedite® Service, A Step-Change Improvement Over Conventional Proppant Flowback Control Systems. Provides Up to Three Times the Conductivity of RCPs., Stimulation, HO3296 May 4, 2004, Halliburton Communications.
Halliburton "CobraFrac$^{SM}$ Service, Coiled Tubing Fracturing—Cost-Effective Method for Stimulating Untapped Reserves", 2 pages, 2004.
Halliburton "CobraJetFrac$^{SM}$ Service, Cost-Effective Technology That Can Help Reduce Cost per BOE Produced, Shorten Cyle time and Reduce Capex".
Halliburton "SurgiFrac$^{SM}$ Service, a Quick and cost-Effective Method to Help Boost Production From Openhole Horizonal Completions", 2002.
Halliburton, SandWedge® NT Conductivity Enhancement System, Enhances Proppant Pack Conductivity and Helps Prevent Intrusion of Formation Material for Improved Long-Term Production, Stimulation, HO2289 May 4, 2004, Halliburton Communications.
Nguyen et al., *A Novel Approach For Enhancing Proppant Consolidation: Laboratory Testing And Field Applications*, SPE Paper No. 77748, 2002.
SPE 15547, *Field Application of Lignosulfonate Gels To Reduce Channeling*, South Swan Hills Miscible Unit, Alberta, Canada, by O.R. Wagner et al, 1986.
Owens et al., *Waterflood Pressure Pulsing for Fractured Reservoirs* SPE 1123, 1996.
Felsenthal et al., *Pressure Pulsing—An Improved Method of Waterflooding Fractured Reservoirs* SPE 1788, 1957.
Raza, "*Water and Gas Cyclic Pulsing Method for Improved Oil Recovery*", SPE 3005, 1971.
Peng et al., "*Pressure Pulsing Waterflooding in Dual Porosity Naturally Fractured Reservoirs*" SPE 17587, 1988.
Dusseault et al, "*Pressure Pulse Workovers in Heavy Oil*", SPE 79033, 2002.
Yang et al., "*Experimental Study on Fracture Initiation By Pressure Pulse*", SPE 63035, 2000.
Nguyen et al., *New Guidelines For Applying Curable Resin-Coated Proppants*, SPE Paper No. 39582, 1997.

Advances in Polymer Science, vol. 157, "*Degradable Aliphatic Polyesters*" edited by A.-C. Alberston, 2001.
Gorman, *Plastic Electric: Lining up the Future of Conducting Polymers* Science News, vol. 163, May 17, 2003.
Gidley et al., "*Recent Advances in Hydraulic Fracturing*," Chapter 6, pp. 109-130, 1989.
Simmons et al., "*Poly(phenyllactide): Synthesis, Characterization, and Hydrolytic Degradation, Biomacromolecules*", vol. 2, No. 2, pp. 658-663, 2001.
Yin et al., "*Preparation and Characterization of Substituted Polylactides*", Americal Chemical Society, vol. 32, No. 23, pp. 7711-7718, 1999.
Yin et al., "*Synthesis and Properties of Polymers Derived from Substituted Lactic Acids*", American Chemical Society, Ch. 12, pp. 147-159, 2001.
Cantu et al., "*Laboratory and Field Evaluation of a Combined Fluid-Loss Control Additive and Gel Breaker for Fracturing Fluids*," SPE 18211, 1990.
Love et al., "*Selectively Placing Many Fractures in Openhole Horizontal Wells Improves Production*", SPE 50422, 1998.
McDaniel et al. "*Evolving New Stimulation Process Proves Highly Effective In Level 1 Dual-Lateral Completion*" SPE 78697, 2002.
Albertsson et al., "*Aliphatic Polyesters: Synthesis, Properties and Applications*", Advances in Polymer Science, vol. 57 Degradable Aliphatic Polyesters, 2002.
Dechy-Cabaret et al., "*Controlled Ring-Operated Polymerization of Lactide and Glycolide*" American Chemical Society, Chemical Reviews, A-Z, AA-AD, 2004.
Funkhouser et al., "*Synthetic Polymer Fracturing Fluid For High-Temperature Applications*", SPE 80236, 2003.
*Chelating Agents*, Encyclopedia of Chemical Technology, vol. 5 (764-795).
Vichaibun et al., "*A New Assay for the Enzymatic Degradation of Polylactic Acid, Short Report*", ScienceAsia, vol. 29, pp. 297-300, 2003.
CDX Gas, CDX Solution, 2003, CDX, LLC, Available @ www.cdxgas.com/solution.html, printed pp. 1-2.
CDX Gas, "*What is Coalbed Methane?*" CDX, LLC. Available @ www.cdxgas.com/what.html, printed p. 1.
Halliburton brochure entitled "H2Zero™ Service Introducing The Next Generation of cost-Effective Conformance Control Solutions", 2002.
Halliburton brochure entitled INJECTROL® A Component, 1999.
Halliburton brochure entitled "INJECTROL® G Sealant", 1999.
Halliburton brochure entitled "INJECTROL® IT Sealant", 1999.
Halliburton brochure entitled "INJECTROL® Service Treatment", 1999.
Halliburton brochure entitled "INJECTROL® U Sealant", 1999.
Halliburton brochure entitled "Sanfix® A Resin", 1999.
Halliburton brochure entitled "Pillar Frac Stimulation Technique" Fracturing Services Technical Data Sheet, 2 pages.
Foreign search report and opinion (CPW 21582 EP), Mar. 11, 2005.
U.S. Appl. No. 10/864,061, filed Jun. 9, 2004, Blauch et al.
U.S. Appl. No. 10/864,618, filed Jun. 9, 2004, Blauch et al.
Halliburton Cobra Frac Advertisement, 2001.
Halliburton Technical Flier—Multi Stage Frac Completion Methods.
SPE 60747, "Optimizing and Managing Coiled Tubing Frac Strings," Serguei Kazakov and Keith Rispler, 2000.
S. W. Almond, et al., "*Factors Affecting Proppant Flowback with Resin Coated Proppants*," Society of Petroleum Engineers, Inc., SPE 30096, p. 171-186, 1995.
Foreign communication related to a counterpart application dated Jul. 31, 2006.

METHODS FOR PRODUCING FLUIDS FROM ACIDIZED AND CONSOLIDATED PORTIONS OF SUBTERRANEAN FORMATIONS

CROSS-REFERENCE TO RELATED APPLICATION

This Application is a continuation in part of U.S. application Ser. No. 10/650,063, filed on Aug. 26, 2003 now U.S. Pat. No. 7,071,665.

BACKGROUND

The present invention relates to methods for enhancing and maintaining well productivity in subterranean formations. More particularly, the present invention relates to improved methods for producing fluids from acidized and consolidated portions of subterranean formations.

Hydrocarbon wells are often located in subterranean formations that comprise unconsolidated particulates. The term "unconsolidated particulates" refers to particulates that are loose within a portion of a formation or that are weakly bonded to the formation such that the movement of fluids within the formation might cause the particulates to migrate. Unconsolidated particulates (such as formation particulates and proppant particulates) may migrate out of a formation with produced fluids. Unconsolidated portions of a subterranean formations include those that contain loose particulates that are readily entrained by produced fluids and those wherein the particulates making up the zone are bonded together with insufficient bond strength to withstand the forces produced by mobile fluids within the subterranean formation. The presence of unconsolidated particulates in produced fluids may be disadvantageous and undesirable in that such particulates may abrade pumping and other producing equipment and may reduce the fluid production capabilities of the producing portions of the subterranean formation.

One method of controlling unconsolidated particulates involves placing a filtration bed of gravel near the well bore to prevent the transport of unconsolidated formation particulates with produced fluids. Typically, such operations are referred to as "gravel packing operations," and they usually involve pumping and placing a quantity of particulates adjacent to a portion of an unconsolidated formation so as to form a gravel pack between the sand screen and perforated, cased well bore or open formation walls. Although used frequently, such methods can be time-consuming and expensive to perform. Another conventional method used to control loose formation particulates in unconsolidated formations involves consolidating a portion of a subterranean formation from which the formation particulates tend to flow by applying a curable resin composition to that portion. In one example of such a technique, an operator preflushes the formation, applies a resin composition, and then applies an afterflush fluid to remove excess resin from the pore spaces within the formation.

In addition to controlling particulates in subterranean formations, certain treatments are often required to stimulate production from the formation. Such treatments generally operate to increase the permeability of the formation to allow for easier fluid flow within the stimulated portion of the formation. Generally, these treatments involve the injection of a treatment fluid into a subterranean formation. One known stimulation treatment is matrix acid stimulation (e.g., "acidizing"). Acidizing involves introducing an acidizing fluid into the formation at a pressure low enough to prevent formation fracturing, and allowing the acidizing fluid to dissolve acid-soluble materials that clog or constrict formation channels. In this way, fluids may more easily flow from the formation into the well bore. Acidizing also may facilitate the flow of injected treatment fluids from the well bore into the formation. When acid is pumped into a formation, such as a carbonate (e.g., limestone or dolomite) formation, the acid flows preferentially into the portion of the formation with the highest solubility or permeability (i.e., large pore spaces, voids, or natural fractures). Acidizing often results in the formation of large, highly conductive flow channels that form close to the well bore.

Another common stimulation technique is hydraulic fracturing, in which a treatment fluid is injected through a well bore into a portion of a formation at a sufficient pressure to create or enhance at least one fracture therein. This often results in a channel for fluid flow through the formation back to the well bore, called a "fracture." Usually a particulate material, often referred to as a "proppant particulate," is deposited into the fracture to help prop the fracture open to enhance produced fluid flow back after the hydraulic pressure is released. Various formations may be treated by creating fractures in the formations and depositing proppant particulates in the fractures to maintain them in open positions. In addition, proppant particulates may be consolidated within the fractures, often resulting in the formation of hard permeable masses that can reduce the migration of particulates during production from the formation. Furthermore, hydraulic fracturing and gravel packing may be combined in one operation commonly referred to as "frac-packing."

Hydraulic fracturing and acidizing may be combined in one treatment commonly referred to as "fracture acidizing." Typically, fracture acidizing involves using hydraulic fracturing to form a fracture and then acidizing the fracture to etch the face of the fracture. When the pressure in the formation is released, the resultant fracture should not completely close because the removal of formation material creates a gap between the fracture faces. See, e.g., U.S. Pat. No. 3,768,564. Proppant particulates also may be used in conjunction with fracture acidizing. See, e.g., U.S. Pat. No. 3,842,911.

However, some formations such as carbonates, unconsolidated sandstones, shales, and chalk formations, may be too weak to effectively and economically use acidizing treatments, either matrix acidizing or fracture acidizing. When acidized, these formations have a tendency to produce formation particulates, e.g., formation fines and sand, along with the produced fluid. This may result in a drastic drop in production as the formation particulates enter and block the proppant particulate pack, flow channels, and formation pore spaces.

SUMMARY

The present invention relates to methods for enhancing and maintaining well productivity in subterranean formations. More particularly, the present invention relates to improved methods for producing fluids from acidized and consolidated portions of subterranean formations. The present invention relates to methods for enhancing and maintaining well productivity in subterranean formations. More particularly, the present invention relates to improved methods for producing fluids from acidized and consolidated portions of subterranean formations.

One embodiment of the present invention provides a method of stimulating and stabilizing an area of a subterranean formation comprising placing an acid fluid into an area of a subterranean formation and allowing the acid to at least partially dissolve a portion of the area of the subterranean formation; placing a consolidation fluid into the area of the subterranean formation; and, placing an afterflush fluid into the area of the subterranean formation.

One embodiment of the present invention provides a method of stimulating and stabilizing an area of a subterranean formation comprising placing an acid fluid into an area of a subterranean formation and allowing the acid to at least partially dissolve a portion of the area of the subterranean formation; placing a consolidation fluid into the area of the subterranean formation; and, placing a fracturing fluid into the area of the subterranean formation at a pressure sufficient to create or extend at least one fracture therein.

The features and advantages of the present invention will be readily apparent to those skilled in the art upon a reading of the description of the embodiments that follows.

DETAILED DESCRIPTION

The present invention relates to methods for enhancing and maintaining well productivity in subterranean formations. More particularly, the present invention relates to improved methods for producing fluids from acidized and consolidated portions of subterranean formations. The present invention relates to methods for enhancing and maintaining well productivity in subterranean formations. More particularly, the present invention relates to improved methods for producing fluids from acidized and consolidated portions of subterranean formations.

In general, the methods of the present invention involve stimulating and stabilizing a subterranean formation by acidizing and consolidating the formation. This involves treating an area of a subterranean formation with an acid fluid capable of at least partially dissolving a portion of the area of the subterranean formation and then placing a consolidation fluid into the acidized area of the formation. The acid fluid dissolves a portion of the area of the subterranean formation, thereby creating cavities, or hollow spaces. The terms "dissolve" and "dissolution" refer to at least a partial removal of solid material from a subterranean formation. Once cavities are formed, a consolidation fluid may be placed in the subterranean formation to consolidate the unconsolidated particulates (e.g., formation particulates, proppant particulates, or both) within the cavities of the formation.

By acidizing the area of the subterranean formation before placing the consolidation fluid, the consolidation fluid may be able to penetrate further into the subterranean formation than it would have been able to penetrate into the formation had the acidizing not occurred. This is thought to be due, at least in part, to the fact that when the consolidation fluid is placed after acidizing, the consolidation fluid can fill into and permeate the cavities rather than just permeating from the surfaces within the subterranean formation. The consolidation fluid acts, among other things, to stabilize the formation and to minimize the migration of formation particulates during production from the formation. The methods of the present invention are particularly well-suited for use in portions of subterranean formations that are at least partially formed of materials that are readily dissolvable under acidic conditions, such as formations comprising carbonate, chalk, limestone, aragonite, dolomite, halite, carbonate-cemented sandstones, or combinations of the above minerals.

In the methods of the present invention, an acid fluid comprising an aqueous liquid and at least one acid is placed into an area of a subterranean formation to dissolve at least a portion of the area of the subterranean formation. Generally, suitable acids comprise aqueous acids including, but are not limited to, hydrochloric acid, $C_1$ to $C_{12}$ carboxylic acids, hydrofluoric acid, acetic acid, formic acid, citric acid, ethylene diamine tetra acetic acid (EDTA), slowly released acids in the form of hydrolyzable esters, including ethylene glycol monoformate, ethylene glycol diformate, poly(lactic acid), poly(gylcolic acid), diethylene glycol diformate, glyceryl monoformate, glyceryl diformate, glyceryl triformate, triethylene glycol diformate and formate esters of pentaerythritol, and combinations thereof. When selecting an aqueous acid for use in the present invention, consideration should be given to the formation temperature, the acid-reactivity of the formation, the porosity of the formation, formation permeability, and injection rate. By way of example and not of limitation, in a formation having a relatively high acid-reactivity and a relatively high temperature, more intricate cavities may be achieved by using a relatively weak acid such as acetic acid. More intricate cavities may allow for a more uniform distribution of the consolidation fluid into the subterranean formation. In addition to considering the type of acid used, the concentration of acid must also be considered. Selection of the concentration of acid to be used is related to the same considerations listed above with respect to selection of the type of acid. It is within the ability of one skilled in the art, with the benefit of this disclosure, to consider the formation at issue, the consolidation desired, and the acid chosen to select an appropriate acid concentration. In some embodiments, the aqueous acid may be used at a concentration of from about 1% to about 70% by volume of the acid fluid. In some embodiments, the aqueous acid may be used at a concentration of from about 5% to about 25% by volume of the acid fluid. Examples of aqueous acids and methods of using aqueous acids are described in U.S. Pat. Nos. 3,768,564; 3,842,911; 4,245,702; 4,683,954; 4,739,832; 4,959,432; 5,238,068; and 6,531,427, the relevant disclosures of which are incorporated herein by reference.

As mentioned above, the consolidation fluids of the present invention are introduced into an area of an acidized subterranean formation and allowed to penetrate into the area of the subterranean formation. The consolidation fluids are generally placed into the area of the subterranean formation at a matrix flow rate such that a sufficient portion of the consolidation fluids may penetrate the formation. Consolidation fluids suitable for use in the present invention can be any substance capable of inhibiting the migration of unconsolidated particulates from a portion of a subterranean formation during production. Suitable consolidation fluids include resin compositions, tackifying agents (both non-aqueous tackifying agents and aqueous tackifying agents), and silyl-modified polyamide compounds.

Resin compositions suitable for use in the consolidation fluids of the present invention include all resins known in the art that are capable of forming a hardened, consolidated mass. Many such resins are commonly used in subterranean consolidation operations, and some suitable resins include two-component epoxy-based resins, novolac resins, polyepoxide resins, phenol-aldehyde resins, urea-aldehyde resins, urethane resins, phenolic resins, furan resins, furan/furfuryl alcohol resins, phenolic/latex resins, phenol formaldehyde resins, polyester resins and hybrids and copolymers thereof, polyurethane resins and hybrids and copolymers thereof, acrylate resins, and mixtures thereof. Some suitable resins, such as epoxy resins, may be cured with an internal catalyst or activator so that when pumped downhole, they may be cured using only time and temperature. Other suitable resins, such as furan resins generally require a time-delayed catalyst or an external catalyst to help activate the polymerization of the resins if the cure temperature is low (i.e., less than 250° F.), but will cure under the effect of time and temperature if the formation temperature is above about 250° F., preferably above about 300° F.

Selection of a suitable resin may be affected by the temperature of the subterranean formation to which the fluid will be introduced. By way of example, for subterranean formations having a bottom hole static temperature ("BHST") ranging from about 60° F. to about 250° F., two-component epoxy-based resins comprising a hardenable resin component and a hardening agent component containing specific hardening agents may be preferred. For subterranean formations having a BHST ranging from about 300° F. to about 600° F., a furan-based resin may be preferred. For subterranean formations having a BHST ranging from about 200° F. to about 400° F., either a phenolic-based resin or a one-component HT epoxy-based resin may be suitable. For subterranean formations having a BHST of at least about 175° F., a phenol/phenol formaldehyde/furfuryl alcohol resin may also be suitable. It is within the ability of one skilled in the art, with the benefit of this disclosure, to select a suitable resin for use in embodiments of the present invention and to determine whether a catalyst is required to trigger curing.

The consolidation fluids used in the methods of the present invention should preferably be controlled to ensure that they have a viscosity sufficient to penetrate the unconsolidated portions of the subterranean formation. For example, where the portion of the subterranean formation being consolidated is a portion neighboring a well bore, from about 3 inches to about 1.5 feet of penetration into the portion neighboring the well bore may be desired. Where the portion of the subterranean formation being consolidated is a portion neighboring a propped fracture, for example, at least about 0.25 inches of penetration into a neighboring fracture wall may be sufficient. To achieve these penetration levels, the viscosity of the consolidation fluid is important. In some embodiments of the present invention the consolidation fluid viscosity is kept below about 100 cP. In other embodiments of the present invention the consolidation fluid viscosity is kept below about 40 cP. In other embodiments of the present invention the consolidation fluid viscosity is kept below about 10 cP. The viscosities recited herein are measured at room temperature, using a Brookfield DV-II viscometer, with a No. 2 spindle at 100 RPM.

Accordingly, any solvent that is compatible with the resin is suitable for use in achieving the desired consolidation fluid viscosity. In some embodiments, the solvent may comprise an aqueous dissolvable solvent, but traditional higher flash point solvents (e.g., flash point above about 125° F.) that are not readily dissolvable in aqueous fluids also may be suitable. Examples of some suitable higher flash point solvents include butyl lactate, butylglycidyl ether, dipropylene glycol methyl ether, dipropylene glycol dimethyl ether, dimethyl formamide, diethyleneglycol methyl ether, ethyleneglycol butyl ether, diethyleneglycol butyl ether, propylene carbonate, methanol, butanol, d'limonene, fatty acid methyl esters, and combinations thereof. Suitable aqueous dissolvable solvents include, but are not limited to, methanol, isopropanol, butanol, glycol ether solvents, and combinations thereof. Suitable glycol ether solvents include, but are not limited to, diethylene glycol methyl ether, dipropylene glycol methyl ether, 2-butoxy ethanol, ethers of a $C_2$ to $C_6$ dihydric alkanol containing at least one $C_1$ to $C_6$ alkyl group, mono ethers of dihydric alkanols, methoxypropanol, butoxyethanol, hexoxyethanol, and isomers thereof. To achieve a suitable viscosity the resin:solvent ratio generally ranges from about 1:0.2 to about 1:20. In some embodiments, the resin:solvent ratio ranges from about 1:1 to about 1:3. Selection of an appropriate solvent, and amount of solvent, is dependent on the resin chosen and is within the ability of one skilled in the art with the benefit of this disclosure.

Nonaqueous tackifying agents suitable for use in the consolidation fluids of the present invention comprise any compound that, when in liquid form or in a solvent solution, will form a nonhardening coating upon a surface. One example of a group of suitable nonaqueous tackifying agents comprise polyamides that are liquids or in solution at the temperature of the subterranean formation such that they are, by themselves, nonhardening when introduced into the formation. Other suitable nonaqueous tackifying agents include condensation reaction products comprised of commercially available polyacids and polyamines. Such commercial products include compounds such as mixtures of $C_{36}$ dibasic acids containing some trimer and higher oligomers and also small amounts of monomer acids that are reacted with polyamines. Other polyacids include trimer acids, synthetic acids produced from fatty acids, maleic anhydride, acrylic acid, and the like. Such acid compounds are commercially available from companies such as Witco Corporation, Union Camp, Chemtall, and Emery Industries. The reaction products are available from, for example, Champion Technologies, Inc. and Witco Corporation. Additional compounds which may be used as nonaqueous tackifying agents include liquids and solutions of, for example, polyesters, polycarbonates and polycarbamates, natural resins such as shellac, and the like. Other suitable nonaqueous tackifying agents are described in U.S. Pat. No. 5,853,048 issued to Weaver, et al. and U.S. Pat. No. 5,833,000 issued to Weaver, et al., the relevant disclosures of which are incorporated herein by reference.

Nonaqueous tackifying agents suitable for use in the present invention may be used either such that they form a nonhardening coating or they may be combined with a multifunctional material capable of reacting with the nonaqueous tackifying agent to form a hardened coating. A "hardened coating," as used herein, means that the reaction of the nonaqueous tackifying agent with the multifunctional material will result in a substantially nonflowable reaction product that exhibits a higher compressive strength in a consolidated agglomerate than the nonaqueous tackifying agent alone with a particulate. In this instance, the nonaqueous tackifying agent may function similarly to a resin (described above). Multifunctional materials suitable for use in the present invention include, but are not limited to, aldehydes such as formaldehyde, dialdehydes such as glutaraldehyde, hemiacetals or aldehyde releasing compounds, diacid halides, dihalides such as dichlorides and dibromides, polyacid anhydrides such as citric acid, epoxides, furfuraldehyde, glutaraldehyde or aldehyde condensates and the like, and combinations thereof. In some embodiments of the present invention, the multifunctional material may be mixed with the nonaqueous tackifying agent in an amount of from about 0.01% to about 50% by weight of the nonaqueous tackifying agent to effect formation of the reaction product. In other embodiments, the multifunctional material is present in an amount of from about 0.5% to about 1% by weight of the nonaqueous tackifying agent. Suitable multifunctional materials are described in U.S. Pat. No. 5,839,510 issued to Weaver, et al., the relevant disclosure of which is incorporated herein by reference. Other suitable nonaqueous tackifying agents are described in U.S. Pat. No. 5,853,048 issued to Weaver, et al., the relevant disclosure of which is incorporated herein by reference.

Solvents suitable for use with the nonaqueous tackifying agents include those that are described above in connection with the resin compositions, as well as, e.g., butyl bottom alcohol, butyl acetate, furfuryl acetate, butyl lactate, dimethyl sulfoxide, and combinations thereof. Selection of an appropriate solvent, and amount of solvent, is dependent on the nonaqueous tackifying agent chosen and is within the ability of one skilled in the art with the benefit of this disclosure.

Suitable aqueous tackifying agents are capable of forming at least a partial coating upon a surface (such as the surface of a proppant particulate). Generally, suitable aqueous tackifying agents are not significantly tacky until they are "activated" (that is destabilized, coalesced, and/or reacted) to transform the aqueous tackifying agent into a sticky, tackifying compound at a desirable time. Such activation may occur before, during, or after the aqueous tackifying agent is placed in the subterranean formation. In some embodiments, a pretreatment may be contacted first with the surface of a particulate to prepare it to be coated with an aqueous tackifying agent. Suitable aqueous tackifying agents are generally charged polymers that comprise compounds that, when in an aqueous solvent or solution, will form a non-hardening coating (by itself or with an activator) and, when placed on a particulate, will increase the continuous critical resuspension velocity of the particulate when contacted by a stream of water. Continuous critical resuspension velocities are further described in Example 7 of U.S. patent application Ser. No. 10/864,061, filed Jun. 9, 2004, the disclosure of which is incorporated herein by reference. The aqueous tackifying agent may enhance the grain-to-grain contact between the individual particulates within the formation (be they proppant particulates, formation particulates, or other particulates), which in turn may help to bring about the consolidation of the particulates into a cohesive, flexible, and permeable mass.

Examples of aqueous tackifying agents suitable for use in the present invention include, but are not limited to, acrylic acid polymers, acrylic acid ester polymers, acrylic acid derivative polymers, acrylic acid homopolymers, acrylic acid ester homopolymers (such as poly(methyl acrylate), poly(butyl acrylate), and poly(2-ethylhexyl acrylate)), acrylic acid ester copolymers, methacrylic acid derivative polymers, methacrylic acid homopolymers, methacrylic acid ester homopolymers (such as poly(methyl methacrylate), poly(butyl methacrylate), and poly(2-ethylhexyl methacrylate)), acrylamido-methyl-propane sulfonate polymers, acrylamido-methyl-propane sulfonate derivative polymers, acrylamido-methyl-propane sulfonate copolymers, and acrylic acid/acrylamido-methyl-propane sulfonate copolymers, and combinations thereof. Methods of determining suitable aqueous tackifying agents and additional disclosure on aqueous tackifying agents can be found in U.S. patent application Ser. No. 10/864,061 filed Jun. 9, 2004 and U.S. patent application Ser. No. 10/864,618 filed Jun. 9, 2004, the disclosures of which are incorporated herein by reference.

Silyl-modified polyamide compounds suitable for use as in a consolidation fluid in the methods of the present invention may be described as substantially self-hardening compositions that are capable of at least partially adhering to particulates in the unhardened state, and that are further capable of self-hardening themselves to a substantially non-tacky state to which individual unconsolidated particulates, such as formation fines, will not adhere to, for example, in the pore throats of a formation or a proppant particulate pack. Such silyl-modified polyamides may be based, for example, on the reaction product of a silating compound with a polyamide or a mixture of polyamides. The polyamide or mixture of polyamides may be one or more polyamide intermediate compounds obtained, for example, from the reaction of a polyacid (e.g., a diacid or higher) with a polyamine (e.g., a diamine or higher) to form a polyamide polymer with the elimination of water. Other suitable silyl-modified polyamides and methods of making such compounds are described in U.S. Pat. No. 6,439,309 issued to Matherly, et al., the relevant disclosure of which is incorporated herein by reference.

In some embodiments, the methods of the present invention further comprise the step of placing a displacement fluid into the area of the subterranean formation between the placement of the acid fluid and the placement of the consolidation fluid. A displacement fluid may be used to push the spent acid further into the subterranean formation, substantially out of the treated area and it may also be used (where desired) to neutralize any unspent acid. In other embodiments, a displacement fluid may be chosen that allows the formation to remain acidic. For example, an acid formation may be preferred when the chosen consolidation fluid is one that cures in the presence of as acid (as may be the case when the consolidation fluid is a furan/furfuryl alcohol resin). It is within the ability of one skilled in the art, with the benefit of this disclosure, to determine if a displacement fluid should be used, and if used, the type and amount of displacement fluid suitable for use.

Generally, the choice of displacement fluid will depend on the acid used and/or the consolidation fluid chosen for use. Further, where the displacement fluid is capable of neutralizing the unspent acid, stronger acids may require more basic displacement fluids. In many cases, however, the displacement fluid may not need to be a strong base because the acid may be spent as it dissolves the materials in the formation. For example, when epoxy-based consolidation fluids are chosen to consolidate the acidized portion of the formation it may be particularly useful to use a displacement fluid because epoxy-based consolidation fluids may not function properly in acidic environments. Generally, suitable displacement fluids are aqueous liquids such as fresh water, seawater, salt water, brine, or a combination thereof. In embodiments wherein acid neutralization is desired the displacement fluid may further comprise a base. Suitable bases include, but are not limited to, ammonium bicarbonate solutions and sodium bicarbonate solutions.

When the methods of the present invention are used on a producing area of a subterranean formation, to restore permeability (and thus the ability of the area to produce) the consolidation fluid should either be substantially removed from the cavities and pore spaces or a fracturing or some other stimulation treatment should be performed on the treated area once the consolidation fluid has cured. Thus, in some embodiments, the methods of the present invention further comprise the step of placing an afterflush fluid into the area of the subterranean formation after the placement of the consolidation fluid. The afterflush fluid may be used, among other things, to at least partially displace the consolidation fluid from the cavities and pore spaces in the formation. The afterflush fluid is preferably placed into the subterranean formation while the consolidation fluid is still in a flowing state. In addition to substantially clearing the pore spaces and cavities, the use of an afterflush fluid may act to force the displaced portion of the consolidation fluid further into the formation so that it produces a negligible impact on subsequent production. In certain embodiments, the afterflush fluid may contain an activator or external catalyst, e.g., to activate a furan/furfuryl alcohol consolidation fluid applied to a low-temperature formation. The afterflush fluid is generally placed into the formation at a matrix flow rate such that a sufficient portion of the consolidation fluid may be displaced from the pore channels to restore the formation to a desired permeability. However, enough of the consolidation fluid should remain in the treated area of the formation to provide effective consolidation of the unconsolidated particulates therein.

Generally, the afterflush fluid may be any fluid that does not adversely react with the other components used in accordance with this invention or with the subterranean formation. In some embodiments, the afterflush fluid may be an aqueous liquid such as fresh water, salt water, brine, seawater, or some combination thereof. In other embodiments the afterflush fluid may be a hydrocarbon fluid, such as a mineral oil, a synthetic oil, an ester, kerosene, diesel, crude oil, or a combination thereof. Generally, the volume of afterflush fluid placed in the subterranean formation ranges from about 0.1 times to about 50 times the volume of the consolidation fluid. In some embodiments of the present invention, the volume of afterflush fluid placed in the subterranean formation ranges from about 2 times to about 5 times the volume of the consolidation fluid.

The methods of the present invention also may be used in conjunction with fracturing operations and frac-packing operations. For instance, in the case of hydraulic fracturing operations, one or more fractures may be introduced into the formation before or after the formation is acidized and consolidated.

Thus, in certain embodiments, the present invention provides methods that comprise: creating or extending a fracture within a subterranean formation; placing an acid fluid into the fracture and allowing it to acidize the formation surrounding the fracture and thus form cavities extending from the face of the fracture into the cavities and formation; placing a consolidation fluid into the fracture and allowing it to penetrate into the formation surrounding the fracture; and, placing an afterflush fluid into the formation surrounding the fracture.

In other embodiments of the present invention a fracturing step may be performed after the area of the formation has been acidized. Thus, in certain embodiments, the present invention provides methods that comprise: placing an acid fluid into the fracture and allowing it to acidize the area of the subterranean formation and thus form cavities extending into the formation; creating or extending a fracture within a subterranean formation; placing a consolidation fluid into the fracture and allowing it to penetrate into the formation surrounding the fracture; and, placing an afterflush fluid into the formation surrounding the fracture.

In still other embodiments of the present invention a fracturing step may be performed after the area of the formation has been consolidated. Thus, in certain embodiments, the present invention provides methods that comprise: placing an acid fluid into the fracture and allowing it to acidize the area of the subterranean formation and thus form cavities extending into the formation; placing a consolidation fluid into the fracture and allowing it to penetrate into the formation surrounding the fracture; and, creating or extending a fracture within a subterranean formation. In some such embodiments the fracturing fluid may act not only to fracture the subterranean formation but may also act as an afterflush fluid but in other embodiments it may be desirable to place an afterflush fluid into the area of the subterranean formation after the consolidation fluid is placed and before the fracture is created or extended.

In embodiments of the present invention wherein a fracturing operation is included in the method, proppant particulates may be used to pack the fracture and, at times, to pack the fracture and create a gravel pack (as in a frac-packing operation). As will be understood by one skilled in the art, if proppant particulates are placed before the acid, the proppant particulate material selected should be capable of withstanding the acid without substantial degradation. Moreover, one skilled in the art will recognize that placing proppant particulates before placing the consolidation fluid may allow the consolidation fluid to aid in consolidating not only formation particulates but also the proppant particulates themselves. A wide variety of particulate materials may be used as proppant particulates in accordance with the present invention, including, but not limited to, sand; nut shells; seed shells; resinous materials; a combination of nut shells or seed shells with a resinous material; bauxite; ceramic materials; glass materials; polymeric materials; Teflon® materials; fruit pits; processed wood; composite particulates prepared from a binder and filler particulates (such as silica, alumina, fumed carbon, carbon black, graphite, mica, titanium dioxide, meta-silicate, calcium silicate, kaolin, talc, zirconia, boron, fly ash, hollow glass microspheres, and solid glass); mixtures thereof, and the like. Proppant particulates used in accordance with the present invention are generally of a size such that formation particulates that can migrate with produced fluids are prevented from being produced from the subterranean formation, e.g., the proppant particulates may filter out migrating sand. The proppant particulates used may have a particle size in the range of from about 2 mesh to about 400 mesh, U.S. Sieve Series. In certain embodiments, the proppant particulate may have a particle size in the range of from about 10 mesh to about 70 mesh, U.S. Sieve Series. In other embodiments, the proppant particulate may have a particle size distribution ranges of 10-20 mesh, 20-40 mesh, 40-60 mesh, or 50-70 mesh, depending on the particle size and distribution of the formation particulates to be screened out by the proppant particulates.

Fracturing fluids (which may be used for fracturing and/or frac-packing) that may be used in accordance with the present invention include any fracturing fluid that is suitable for use in subterranean operations, such as gelled water-based fluids, viscoelastic surfactant gels, hydrocarbon-based fluids, foams, and emulsions. In one embodiment of the present invention, the fracturing fluid used to create the one or more fractures may be a viscoelastic surfactant fluid comprising worm-like micelles. In another embodiment of the present invention, the fracturing fluid may be a gelled treatment fluid that comprises water (e.g., fresh water, salt water, brine, or sea water) and a gelling agent for increasing the viscosity of the fracturing fluid. The increased viscosity, among other things, reduces fluid loss and allows the fracturing fluid to transport significant concentrations of proppant particulates into the created fractures. The selection of an appropriate fracturing fluid is within the ability of one of ordinary skill in the art, with the benefit of this disclosure.

Therefore, the present invention is well adapted to attain the ends and advantages mentioned as well as those that are inherent therein. While numerous changes may be made by those skilled in the art, such changes are encompassed within the spirit of this invention as defined by the appended claims.

What is claimed is:

1. A method of stimulating and stabilizing an area of a subterranean formation comprising:
placing an acid fluid into an area of a subterranean formation;
allowing the acid to at least partially dissolve a portion of the area of the subterranean formation;
placing a consolidation fluid that comprises a tackifying agent into the area of the subterranean formation; and,
placing an afterflush fluid into the area of the subterranean formation.

2. The method of claim 1 wherein the area of the subterranean formation is at least partially formed from a material that is at least partially dissolvable under acidic conditions.

3. The method of claim 2 wherein the material that is at least partially dissolvable under acidic conditions comprises a material chosen from the group consisting of: carbonate, chalk, limestone, aragonite, dolomite, halite, a carbonate cemented sandstone, and combinations thereof.

4. The method of claim 1 further comprising the step of placing a displacement fluid into the subterranean formation directly after the step of placing the acid fluid into the area of the subterranean formation.

5. The method of claim 4 wherein the displacement fluid comprises an aqueous liquid.

6. The method of claim 5 wherein the aqueous liquid is fresh water, salt water, seawater, brine, or a combination thereof.

7. The method of claim 4 wherein the displacement fluid further comprises a component selected from the group consisting of: ammonium bicarbonate, sodium bicarbonate, and combinations thereof.

8. The method of claim 1 wherein the acid fluid comprises an aqueous liquid and an aqueous acid.

9. The method of claim 8 wherein the aqueous acid is selected from the group consisting of: hydrochloric acid, $C_1$ to $C_{12}$ carboxylic acids, hydrofluoric acid, acetic acid, formic acid, citric acid, ethylene diamine tetra acetic acid, hydrolyzable esters, ethylene glycol monoformate, ethylene glycol diformate, diethylene glycol diformate, poly(lactic acid), poly(glycolic acid), glyceryl monoformate, glyceryl diformate, glyceryl triformate, triethylene glycol diformate, formate esters of pentaerythritol, and combinations thereof.

10. The method of claim 8 wherein acid fluid comprises from about 1% to about 70% aqueous acid by volume of the acid fluid.

11. The method of claim 1 wherein the consolidation fluid further comprises a resin composition.

12. The method of claim 11 wherein the resin composition comprises a resin selected from the group consisting of: a two-component epoxy-based resin, a novolac resin, a polyepoxide resin, a phenol-aldehyde resin, a urea-aldehyde resin, a urethane resin, a phenolic resin, a furan resin, a furan/furfuryl alcohol resin, a phenolic/latex resin, a phenol formaldehyde resin, a polyester resin and hybrids and copolymers thereof, a polyurethane resin and hybrids and copolymers thereof, an acrylate resin, and combinations thereof.

13. The method of claim 11 wherein the consolidation fluid comprises an internal catalyst or activator.

14. The method of claim 11 wherein the consolidation fluid comprises a time-delayed catalyst or an external catalyst.

15. The method of claim 1 wherein the tackifying agent comprises a nonaqueous tackifying agent.

16. The method of claim 15 wherein the nonaqueous tackifying agent is selected from the group consisting of: a polyamide, a polyester, a polycarbonate, a natural resin, and combinations thereof.

17. The method of claim 15 wherein the nonaqueous tackifying agent further comprises a multifunctional material.

18. The method of claim 17 wherein the multifunctional material is selected from the group consisting of: an aldehyde; a dialdehyde; a glutaraldehyde; a hemiacetal; an aldehyde releasing compound; a diacid halide; a dihalide; a dichloride; a dibromide; a polyacid anhydride; a citric acid; an epoxide; furfuraldehyde, glutaraldehyde or aldehyde condensates; and combinations thereof.

19. The method of claim 17 wherein the multifunctional material is mixed with the nonaqueous tackifying agent in an amount of from about 0.01% to about 50% by weight of the nonaqueous tackifying agent.

20. The method of claim 1 wherein the tackifying agent comprises an aqueous tackifying agent.

21. The method of claim 20 wherein the aqueous tackifying agent comprises a polymer selected from the group consisting of: an acrylic acid polymer, an acrylic acid ester polymer, an acrylic acid derivative polymer, an acrylic acid homopolymer, an acrylic acid ester homopolymer, an acrylic acid ester copolymer, a methacrylic acid derivative polymer, a methacrylic acid homopolymer, a methacrylic acid ester homopolymer, an acrylamido-methyl-propane sulfonate polymer, an acrylamido-methyl-propane sulfonate derivative polymer, an acrylamido-methyl-propane sulfonate copolymer, and an acrylic acid/acrylamido-methyl-propane sulfonate copolymer, and combinations thereof.

22. The method of claim 1 wherein the consolidation fluid further comprises a silyl-modified polyamide compound.

23. The method of claim 22 wherein the silyl-modified polyamide compound comprises a reaction product of a silating compound with a polyamide or a mixture of polyamides.

24. The method of claim 1 wherein the consolidation fluid further comprises a solvent.

25. The method of claim 24 wherein the solvent is selected from the group consisting of: methanol, isopropanol, butanol, a glycol ether, and combinations thereof.

26. The method of claim 24 wherein the solvent is selected from the group consisting of: a butyl lactate, a butylglycidyl ether, a dipropylene glycol methyl ether, a dipropylene glycol dimethyl ether, a dimethyl formamide, a diethyleneglycol methyl ether, an ethyleneglycol butyl ether, a diethyleneglycol butyl ether, a propylene carbonate, a methanol, a butanol, a d-limonene, a fatty acid methyl ester, an isopropanol, a butyl bottom alcohol, a butyl acetate, a furfuryl acetate, a butyl lactate, a dimethyl sulfoxide, a glycol ether solvent and isomers thereof, a diethylene glycol methyl ether, a dipropylene glycol methyl ether, a 2-butoxy ethanol, an ether of a $C_2$ to $C_6$ dihydric alkanol containing at least one $C_1$ to $C_6$ alkyl group, a mono ether of a dihydric alkanol, a methoxypropanol, a butoxyethanol, a hexoxyethanol, and combinations thereof.

27. The method of claim 1 wherein the consolidation fluid has a viscosity below about 100 cP.

28. The method of claim 1 wherein the consolidation fluid has a viscosity below about 40 cP.

29. The method of claim 1 wherein the consolidation fluid has a viscosity below about 10 cP.

30. The method of claim 1 wherein the afterflush fluid comprises an aqueous liquid.

31. The method of claim 30 wherein aqueous liquid is selected from the group consisting of: fresh water, salt water, seawater, brine, and combinations thereof.

32. The method of claim 30 wherein the afterflush fluid comprises an activator or an external catalyst.

33. The method of claim 1 wherein the afterflush fluid comprises a hydrocarbon fluid.

34. The method of claim 33 wherein the hydrocarbon fluid is selected from the group consisting of: mineral oil, synthetic oil, an ester, kerosene, diesel, crude oil, and combinations thereof.

35. The method of claim 1 wherein the afterflush fluid is placed in the portion of the subterranean formation in an amount in the range of from about 0.1 to about 50 times the volume of the consolidation fluid.

36. The method of claim 1 wherein the afterflush fluid is placed in the portion of the subterranean formation in an amount in the range of from about 2 to about 5 times the volume of the consolidation fluid.

37. A method of stimulating and stabilizing an area of a subterranean formation comprising:
placing an acid fluid into an area of a subterranean formation;
allowing the acid to at least partially dissolve a portion of the area of the subterranean formation;
placing a consolidation fluid into the area of the subterranean formation;
placing a fracturing fluid into the area of the subterranean formation at a pressure sufficient to create or extend at least one fracture therein; and
placing an afterflush fluid into the area of the subterranean formation after the step of placing the consolidation fluid,
wherein the step of placing a fracturing fluid occurs:
before the step of placing an acid fluid; or
after the step of placing an acid fluid and before the step of placing a consolidation fluid.

38. The method of claim 37 wherein the area of the subterranean formation is at least partially formed from a material that is at least partially dissolvable under acidic conditions.

39. The method of claim 38 wherein the material that is at least partially dissolvable under acidic conditions is selected from the group consisting of: carbonate, chalk, limestone, aragonite, dolomite, halite, a carbonate cemented sandstone, and combinations thereof.

40. The method of claim 37 further comprising the step of placing a displacement fluid into the subterranean formation directly after the step of placing the acid fluid.

41. The method of claim 40 wherein the displacement fluid comprises an aqueous liquid.

42. The method of claim 41 wherein the aqueous liquid is selected from the group consisting of: fresh water, salt water, seawater, brine, and combinations thereof.

43. The method of claim 41 wherein the displacement fluid comprises ammonium bicarbonate or sodium bicarbonate.

44. The method of claim 37 wherein the acid fluid comprises an aqueous liquid and an aqueous acid.

45. The method of claim 44 wherein the aqueous acid is selected from the group consisting of: hydrochloric acid, $C_1$ to $C_{12}$ carboxylic acids, hydrofluoric acid, acetic acid, formic acid, citric acid, ethylene diamine tetra acetic acid, hydrolysable esters, ethylene glycol monoformate, ethylene glycol diformate, diethylene glycol diformate, poly(lactic acid), poly(glycolic acid), glyceryl monoformate, glyceryl diformate, glyceryl triformate, triethylene glycol diformate, formate esters of pentaerythritolor, and combinations thereof.

46. The method of claim 44 wherein acid fluid comprises from about 1% to about 70% aqueous acid by volume of the acid fluid.

47. The method of claim 37 wherein the consolidation fluid comprises a resin composition.

48. The method of claim 47 wherein the resin composition is selected from the group consisting of: a two-component epoxy-based resin, a novolac resin, a polyepoxide resin, a phenol-aldehyde resin, a urea-aldehyde resin, a urethane resin, a phenolic resin, a furan resin, a furan/furfuryl alcohol resin, a phenolic/latex resin, a phenol formaldehyde resin, a polyester resin and hybrids and copolymers thereof, a polyurethane resin and hybrids and copolymers thereof, an acrylate resin, and combinations thereof.

49. The method of claim 47 wherein the consolidation fluid comprises an internal catalyst or an activator.

50. The method of claim 47 wherein the consolidation fluid comprises a time-delayed catalyst or an external catalyst.

51. The method of claim 37 wherein the consolidation fluid comprises a tackifying agent.

52. The method of claim 51 wherein the tackifying agent comprises a nonaqueous tackifying agent.

53. The method of claim 52 wherein the nonaqueous tackifying agent is selected from the group consisting of: a polyamide, a polyester, a polycarbonate, a natural resin, and combinations thereof.

54. The method of claim 52 wherein the nonaqueous tackifying agent further comprises a multifunctional material.

55. The method of claim 54 wherein the multifunctional material is selected from the group consisting of: an aldehyde; a dialdehyde; a glutaraldehyde; a hemiacetal; an aldehyde releasing compound; a diacid halide; a dihalide; a dichloride; a dibromide; a polyacid anhydride; a citric acid; an epoxide; furfuraldehyde, glutaraldehyde or aldehyde condensates; and combinations thereof.

56. The method of claim 54 wherein the multifunctional material is mixed with the nonaqueous tackifying agent in an amount of from about 0.01% to about 50% by weight of the nonaqueous tackifying agent.

57. The method of claim 51 wherein the tackifying agent comprises an aqueous tackifying agent.

58. The method of claim 57 wherein the aqueous tackifying agent is selected from the group consisting of: an acrylic acid polymer, an acrylic acid ester polymer, an acrylic acid derivative polymer, an acrylic acid homopolymer, an acrylic acid ester homopolymer, an acrylic acid ester copolymer, a methacrylic acid derivative polymer, a methacrylic acid homopolymer, a methacrylic acid ester homopolymer, an acrylamido-methyl-propane sulfonate polymer, an acrylamido-methyl-propane sulfonate derivative polymer, an acrylamido-methyl-propane sulfonate copolymer, and an acrylic acid/acrylamido-methyl-propane sulfonate copolymer, and combinations thereof.

59. The method of claim 37 wherein the consolidation fluid comprises a silyl-modified polyamide compound.

60. The method of claim 59 wherein the silyl-modified polyamide compound comprises a reaction product of a silating compound with a polyamide or a mixture of polyamides.

61. The method of claim 37 wherein the consolidation fluid further comprises a solvent.

62. The method of claim 61 wherein the solvent is selected from the group consisting of: methanol, isopropanol, butanol, a glycol ether, and combinations thereof.

63. The method of claim 61 wherein the solvent is selected from the group consisting of: a butyl lactate, a butylglycidyl ether, a dipropylene glycol methyl ether, a dipropylene glycol dimethyl ether, a dimethyl formamide, a diethyleneglycol methyl ether, an ethyleneglycol butyl ether, a diethyleneglycol butyl ether, a propylene carbonate, a methanol, a butanol, a d-limonene, a fatty acid methyl ester, an isopropanol, a butyl bottom alcohol, a butyl acetate, a furfuryl acetate, a butyl lactate, a dimethyl sulfoxide, a glycol ether solvent and isomers thereof, a diethylene glycol methyl ether, a dipropylene glycol methyl ether, a 2-butoxy ethanol, an ether of a $C_2$ to $C_6$ dihydric alkanol containing at least one $C_1$ to $C_6$ alkyl group, a mono ether of a dihydric alkanol, a methoxypropanol, a butoxyethanol, a hexoxyethanol, and combinations thereof.

64. The method of claim 37 wherein the consolidation fluid has a viscosity below about 100 cP.

65. The method of claim 37 wherein the consolidation fluid has a viscosity below about 40 cP.

66. The method of claim 37 wherein the consolidation fluid has a viscosity below about 10 cP.

67. The method of claim 37 wherein the fracturing fluid is selected from the group consisting of: a gelled aqueous fluid, a viscoelastic surfactant gel, a hydrocarbon-based fluid, a foam, an emulsion, and combinations thereof.

68. The method of claim 37 wherein the fracturing fluid further comprises proppant particulates.

69. The method of claim 68 wherein the proppant particulate is selected from the group consisting of: sand; bauxite; nut shells encased within resin; ceramic materials; glass materials; polymeric materials; resinous materials; nut shells; seed shells; fruit pits; processed wood; composite particulates prepared from a binder and filler particulates such as silica, alumina, fumed carbon, carbon black, graphite, mica, titanium dioxide, meta-silicate, calcium silicate, kaolin, talc, zirconia, boron, fly ash, hollow glass microspheres, and solid glass; and combinations thereof.

70. The method of claim 68 wherein the proppant particulate has a particle size in the range of from about 2 to about 400 mesh, U.S. Sieve Series.

71. The method of claim 61 wherein the solvent is selected from the group consisting of: methanol, isopropanol, butanol, a glycol ether, and combinations thereof.

* * * * *